US011996080B2

(12) United States Patent
Chang et al.

(10) Patent No.: US 11,996,080 B2
(45) **Date of Patent: *May 28, 2024**

(54) ELECTRONIC SYSTEM WITH HEAT DISSIPATION AND FEED-FORWARD ACTIVE NOISE CONTROL FUNCTION AND RELATED METHOD

(71) Applicant: ACER INCORPORATED, New Taipei (TW)

(72) Inventors: Jia-Ren Chang, New Taipei (TW); Ruey-Ching Shyu, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/203,656

(22) Filed: May 31, 2023

(65) Prior Publication Data

US 2023/0306950 A1 Sep. 28, 2023

Related U.S. Application Data

(63) Continuation of application No. 17/519,550, filed on Nov. 4, 2021, now Pat. No. 11,705,104.

(30) Foreign Application Priority Data

Sep. 6, 2021 (TW) ................................ 110133038

(51) Int. Cl.
*G10K 11/178* (2006.01)

(52) U.S. Cl.
CPC .. *G10K 11/17854* (2018.01); *G10K 11/17875* (2018.01); *G10K 2210/11* (2013.01); *G10K 2210/3028* (2013.01)

(58) Field of Classification Search
CPC ....... G10K 11/17854; G10K 11/17875; G10K 2210/11; G10K 2210/3028
(Continued)

(56) References Cited

U.S. PATENT DOCUMENTS 6,201,872 B1 * 3/2001 Hersh .............. G10K 11/17883 381/71.7
2002/0003887 A1 * 1/2002 Zhang .............. G10K 11/17854 381/71.8
(Continued)

FOREIGN PATENT DOCUMENTS

CN 101354885 B 10/2012
CN 213877568 U 8/2021
(Continued)

OTHER PUBLICATIONS

Wang Haifei et al., An Experimental Investigation of Propeller Noise in Forward Flow, 25th AIAA/CEAS Aeroacoustics Conference [AIAA 2019-2620] Delft, The Netherlands: American Institute of Aeronautics and Astronautics Inc., May 2019, p. 1~13.

*Primary Examiner* — Vivian C Chin
*Assistant Examiner* — Douglas J Suthers
(74) *Attorney, Agent, or Firm* — Winston Hsu

(57) ABSTRACT

An electronic system includes a fan module, an embedded controller, a reference microphone, an error microphone, an active noise cancellation controller, and a micro speaker module. The reference microphone is configured to output a wide-band noise signal associated with the operation of the fan module. The error microphone is configured to output an error signal by detecting the noise level during the operation of the electronic system. According to the wide-band noise signal, the error signal and the fan information provided by the embedded controller, the active noise cancellation controller calculates the narrow-band noises and the wide-band noises generated by the fan module, and drives the micro (Continued)

speaker module accordingly for providing a noise cancellation signal. The error signal may be reduced to zero by adaptively adjusting the noise cancellation signal for canceling the noises generated during the operation of the electronic system.

20 Claims, 3 Drawing Sheets

(58) Field of Classification Search
USPC .......................................................... 381/71.11
See application file for complete search history.

(56) References Cited

U.S. PATENT DOCUMENTS

| | | | | |
|---|---|---|---|---|
| 2007/0060038 | A1* | 3/2007 | Yamashita ............ | F24F 1/0068<br>454/248 |
| 2016/0160879 | A1* | 6/2016 | Julienne ................ | F04D 29/362<br>416/1 |
| 2017/0243574 | A1* | 8/2017 | Wu .................. | G10K 11/17823 |
| 2018/0102124 | A1* | 4/2018 | Huo ................. | G10K 11/17823 |

FOREIGN PATENT DOCUMENTS

| | | |
|---|---|---|
| TW | I353579 | 12/2011 |
| TW | 201731301 A | 9/2017 |

* cited by examiner

ELECTRONIC SYSTEM WITH HEAT DISSIPATION AND FEED-FORWARD ACTIVE NOISE CONTROL FUNCTION AND RELATED METHOD

CROSS REFERENCE TO RELATED APPLICATIONS

This application is a continuation application of U.S. application Ser. No. 17/519,550, filed on Nov. 4, 2021. The content of the application is incorporated herein by reference.

BACKGROUND OF THE INVENTION

1. Field of the Invention

The present invention is related to an electronic system with heat dissipation and feed-forward active noise control function and a related method, and more particularly, to an electronic system with heat dissipation and feed-forward active wide-band noise control function and related method.

2. Description of the Prior Art

Computer systems have been widely used in modern society. Computer components depend on the passage of electric current to process information. The current flow through the resistive elements of the computer components is accompanied by heat dissipation. The essence of thermal design is the safe removal of this internally generated heat which may jeopardize the components safety and reliability. An electronic system normally adopts a fan capable of accelerating the exchange of air for heat dissipation purpose.

The rotational speed and the static pressure of a fan determine the volume of air which the fan delivers per minute or per hour. The noise generated during the operation of the fan is roughly proportional to the fan speed to the power of 5. More efficient heat dissipation can be achieved using a faster fan speed, but with the main drawback of generating more noises. The trend of adopting more powerful central processing units (CPUs) and miniaturization increase the amount of heat produced per unit area of the components. Therefore, there is a need of addressing the issues of heat dissipation and noise reduction at the same time.

SUMMARY OF THE INVENTION

The present invention provides an electronic system with heat dissipation and feed-forward active noise control function. The electronic system includes a fan module, an embedded controller, a reference microphone, an error microphone, an active noise cancellation controller, and a micro speaker module. The fan module is configured to operate according to a fan control signal for providing heat dissipation. The active noise cancellation controller is configured to acquire an actual single-blade fundamental frequency, an actual single-blade overtone frequency, an actual BPF fundamental frequency, an actual BPF overtone frequency and an actual wide-band noise spectrum of the fan module during operation according to a synchronization signal which includes information associated with a structure and an operational setting of the fan module, a wide-band noise signal associated with a wide-band noise generated during an operation of the fan module, and an error signal associated with a noise level during an operation of the electronic system. The active noise cancellation controller is further configured to provide a speaker control signal according to the actual single-blade fundamental frequency, the actual single-blade overtone frequency, the actual BPF fundamental frequency, the actual BPF overtone frequency and the actual wide-band noise spectrum of the fan module. The micro speaker module is configured to generate a cancellation noise signal according to the speaker control signal, wherein the cancellation noise signal includes a plurality of noise compensation signals which are reverse signals respectively associated with the actual single-blade fundamental frequency, the actual single-blade overtone frequency, the actual BPF fundamental frequency, the actual BPF overtone frequency and the actual wide-band noise spectrum.

The present invention also provides a method of providing heat dissipation and feed-forward active noise control function in an electronic system. The methods includes operating by a fan module in the electronic system according to a fan control signal for providing heat dissipation; providing a synchronization signal which includes information associated with a structure and an operational setting of the fan module; detecting a wide-band noise generated during an operation of the fan module and for providing a corresponding wide-band noise signal; detecting a noise level during an operation of the electronic system and for providing a corresponding error signal; operating by an active noise cancellation controller in the electronic system for acquiring an actual single-blade fundamental frequency, an actual single-blade overtone frequency, an actual BPF fundamental frequency, an actual BPF overtone frequency and an actual wide-band noise spectrum of the fan module during operation according to the synchronization signal, the wide-band noise signal and the error signal; operating by the active noise cancellation controller for providing a speaker control signal according to the actual single-blade fundamental frequency, the actual single-blade overtone frequency, the actual BPF fundamental frequency, the actual BPF overtone frequency and the actual wide-band noise spectrum of the fan module; and operating by a micro speaker module in the electronic system for generating a cancellation noise signal according to the speaker control signal, wherein the cancellation noise signal includes a plurality of noise compensation signals which are reverse signals respectively associated with the actual single-blade fundamental frequency, the actual single-blade overtone frequency, the actual BPF fundamental frequency, the actual BPF overtone frequency and the actual wide-band noise spectrum.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
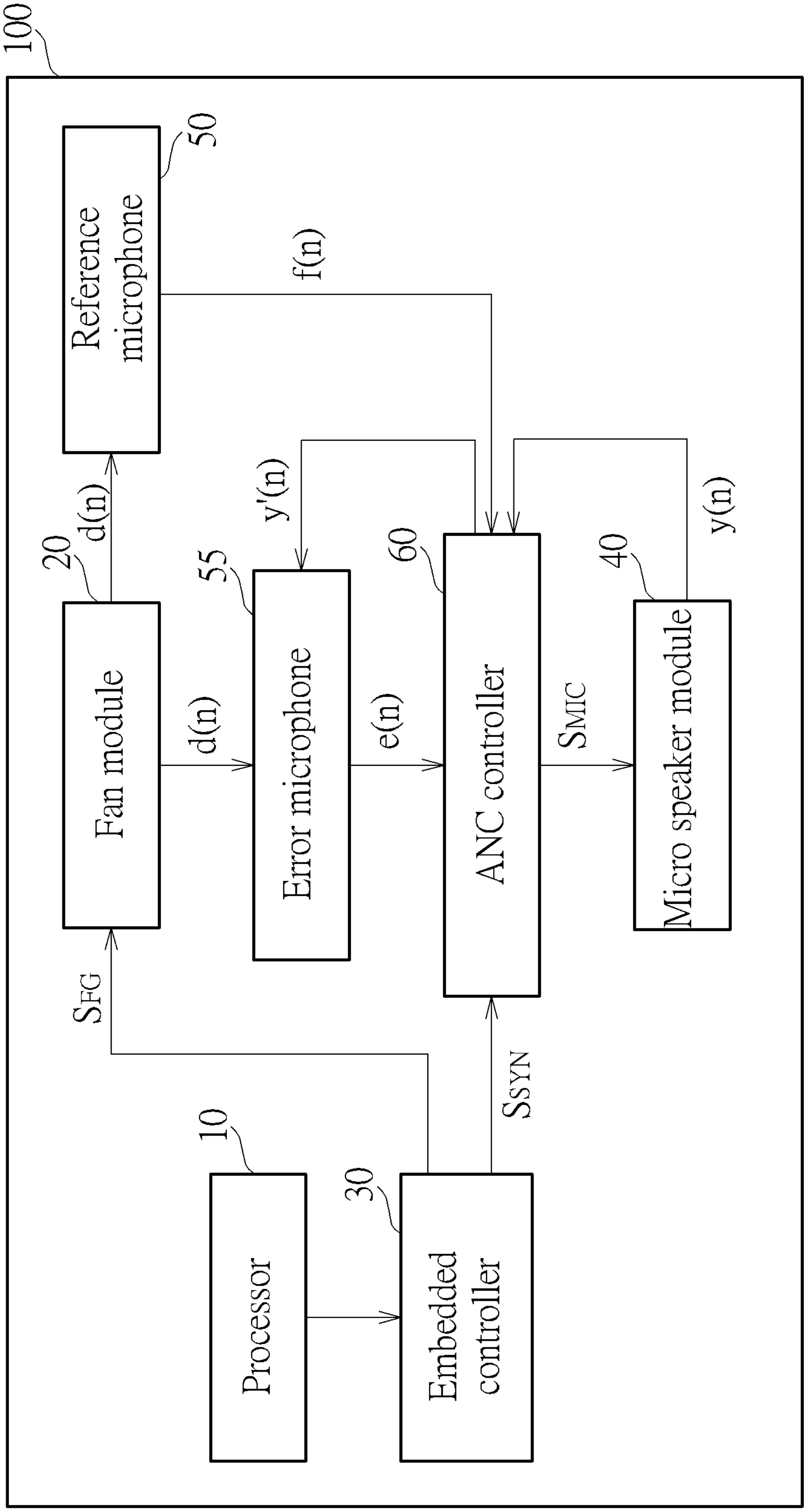
FIG. 1 is a functional diagram illustrating an electronic system with heat dissipation and feed-forward active noise control function according to an embodiment of the present invention.

FIG. 1 is a functional diagram illustrating an electronic system 100 with heat dissipation and feed-forward active noise control function according to an embodiment of the present invention. The electronic system 100 includes a processor 10, a fan module 20, an embedded controller (EC) 30, a micro speaker module 40, a reference microphone 50, an error microphone 55, and an active noise cancellation (ANC) controller 60.

The processor 10 may be a central processing unit (CPU) or a graphic processing unit (GPU). As the key engine of executing commands and procedures for running the operating system, the processor 10 is the main source of generating waste heat in the electronic system 100.

The fan module 20 may have different structures depending on its module. Basically speaking, the fan blades are driven by a motor into rotation for drawing cool air into the housing and pushing out warm air for heat dissipation purpose. In the present invention, the fan module 20 is configured to operate according to a fan control signal $S_{FG}$ provided by the embedded controller 30. A larger value of the fan control signal $S_{FG}$ results in a faster rotational speed of the motor in the fan module 20. More efficient heat dissipation can be achieved by increasing the rotational speed of the motor in the fan module 20, but with the main drawback of raising the noise level. During the operation of the electronic system 100, the fan module 20 is the main source of generating noises. In an embodiment, the fan control signal $S_{FG}$ may be a pulse width modulation (PWM) square wave which can be used to adjust the motor speed of the fan module 20 by varying its duty cycle. In an embodiment, the fan module 20 may include one or multiple axial fans or centrifugal fans. However, the number, the type and the driving method of the fans in the fan module 20 do not limit the scope of the present invention.

The embedded controller 30 may store the EC code of each task and timing constraints of the boot process. In the turned-off state, the embedded controller 30 continues to operate for awaiting the wake-up message from the user. In the turned-on state, the embedded controller 30 is configured to control the standby/hibernate mode, the keyboard controller, the charge indicator and the motor speed of the fan module 20. The embedded controller 30 normally includes a thermal sensor (not shown in FIG. 1) for monitoring the operational temperature of the processor 10, thereby outputting the fan control signal $S_{FG}$ accordingly. When the operational temperature of the processor 10 raises, the duty cycle of the fan control signal $S_{FG}$ is increased accordingly for accelerating the motor speed of the fan module 20; when the operational temperature of the processor 10 drops, the duty cycle of the fan control signal $S_{FG}$ is decreased accordingly for reducing the motor speed of the fan module 20.

The micro speaker module 40 is an electronic component capable of converting electronic signals into audio signals and normally includes diaphragms and a control circuit made of electromagnets and coils. The micro speaker module 40 is configured to operate according to a speaker control signal $S_{MIC}$ provided by the ANC controller 60. When the current of the speaker control signal $S_{MIC}$ flows through the coils in the micro speaker module 40, the coils vibrate in the same frequency of the current. The diaphragms attached to the coils also start to vibrate, thereby causing disturbance in surrounding air for producing sound. In an embodiment of the present invention, the diaphragms of the micro speaker module 40 are disposed inside the air venting structure of the fan module 20 and configured to generate a noise cancellation signal y(n) according to the speaker control signal $S_{MIC}$.

The reference microphone 50 is disposed near the fan blades of the fan module 20 for measuring noises generated by the fan module 20 during operation and for transmitting a corresponding wide-band noise signal f(n) to the ANC controller 60, wherein the wide-band noise signal f(n) includes the wide-band noise spectrum of the turbulence noises generated by the fan module 20 during operation. In an embodiment, the reference microphone 50 may be a micro electro mechanical system (MEMS) microphone characterized in high heat tolerance, high anti-vibration and high RF immunity. However, the type of the reference microphone 50 does not limit the scope of the present invention.

The error microphone 55 is configured to capture noises during the operation of the electronic system 100 and output a corresponding error signal e(n) to the ANC controller 60, wherein the error signal e(n) indicates the noise level which is desirably to be reduced to zero. Since the fan module 20 is the main noise source, the error microphone 55 may be disposed near the air outlet of the fan module 20, wherein the distance between the reference microphone 50 and the ANC controller 60 is larger than the distance between the error microphone 55 and the ANC controller 60. The error microphone 55 may detect noises via a primary path and a secondary path. A noise signal d(n) may be detected by the error microphone 55 via the primary path which is associated with the signal transmission path between the fan module 20 and the error microphone 55. A calibrated noise cancellation signal y'(n) associated with the noise cancellation signal y(n) may be detected by the error microphone 55 via the secondary path which is associated with the signal transmission path between the micro speaker module 40 and the error microphone 55. More specifically, the error signal e(n) outputted by the error microphone 55 is the difference between the noise signal d(n) and the calibrated noise cancellation signal y'(n), and a smaller value of the error signal e(n) indicates better noise cancellation. In an embodiment, the error microphone 55 may be an MEMS microphone characterized in high heat tolerance, high anti-vibration and high RF immunity. However, the type of the error microphone 55 does not limit the scope of the present invention.

The ANC controller 60 is configured to receive a synchronization signal $S_{SYN}$ from the embedded controller 30, receive the wide-band noise signal f(n) from the reference microphone 55, and receive the error signal e(n) from the error microphone 55, wherein the synchronization signal $S_{SYN}$ includes the information associated with the structure of the fan module 20 (such as the number of blades in each fan) and the operational setting (such as the motor speed in different operational modes). Based on the synchronization signal $S_{SYN}$ and the wide-band noise signal f(n), the ANC controller 60 may calculate the actual wide-band noises among the noises generated by the fan module 20 during operation. Based on the synchronization signal $S_{SYN}$ and the error signal e(n), the ANC controller 60 may calculate the narrow-band noises among the noises generated by the fan module 20 during operation. Based on the calculated wide-band and narrow-band noises, the ANC controller 60 may provide the speaker control signal $S_{MIC}$ accordingly for driving the micro speaker module 40. This way, the noise signal d(n) may be effectively canceled by the noise cancellation signal y(n) provided by the micro speaker module 40, with the expectation to keep the error signal e(n) at zero.

Figure 2:
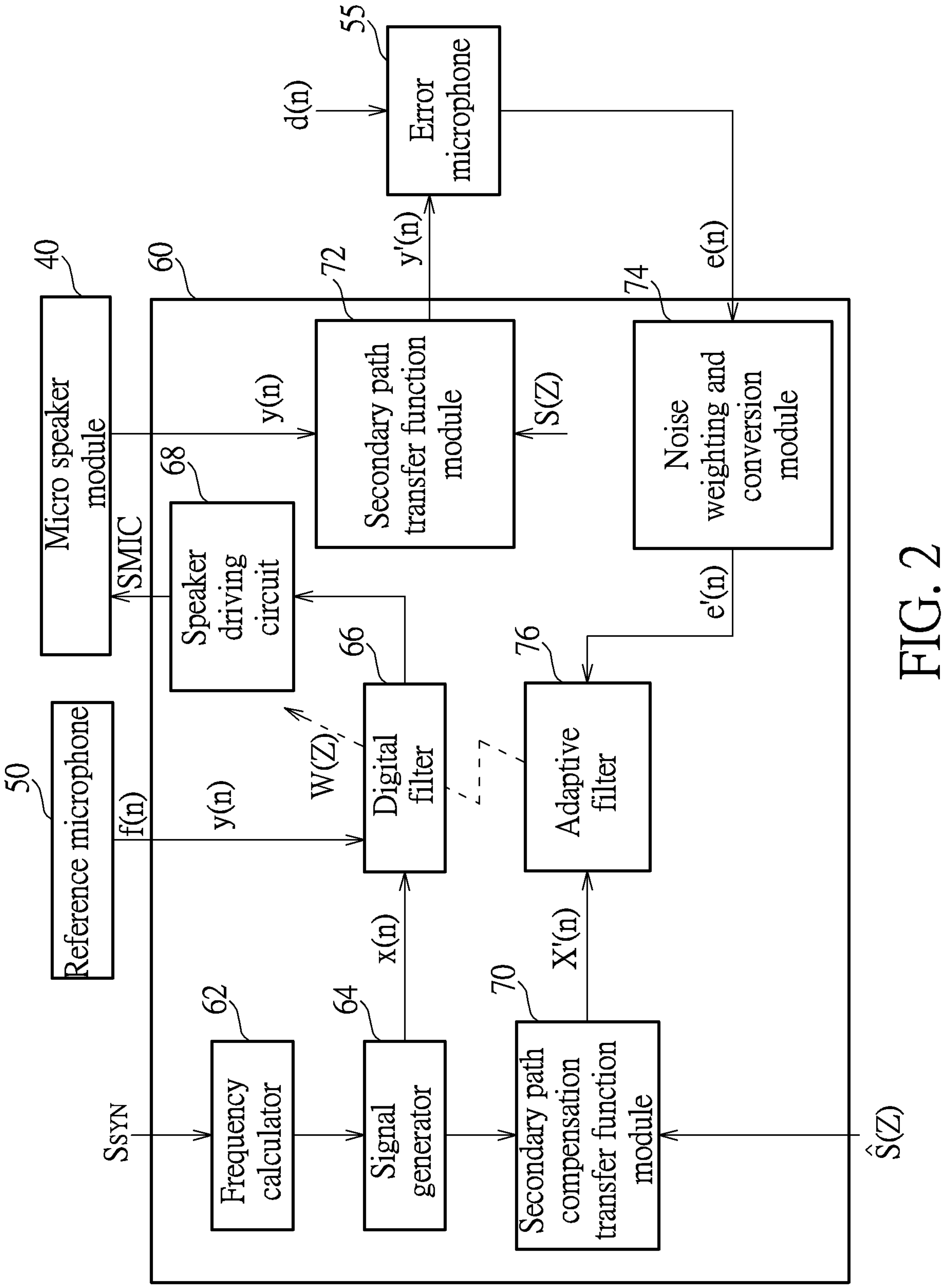
FIG. 2 is a diagram illustrating an implementation of an ANC controller in an electronic system according to an embodiment of the present invention.

FIG. 2 is a diagram illustrating an implementation of the ANC controller 60 in the electronic system 100 according to an embodiment of the present invention. The ANC controller 60 includes a frequency calculator 62, a signal generator 64, a digital filter 66, a speaker driving circuit 68, a secondary path compensation transfer function module 70, a secondary path transfer function module 72, a noise weighting and conversion module 74, and an adaptive filter 76.

Figure 3:
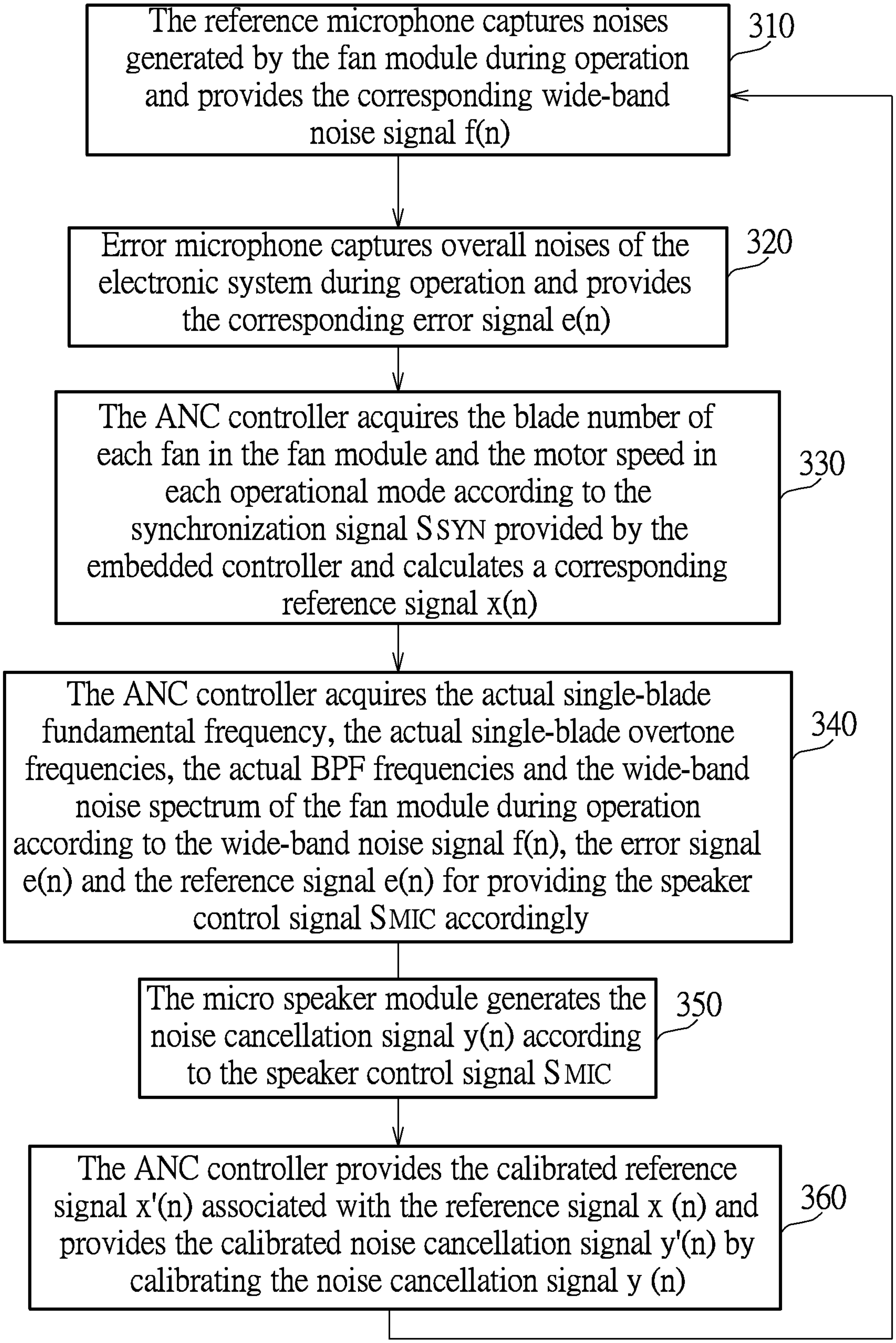
FIG. 3 is a flowchart illustrating the operation of an electronic system according to an embodiment of the present invention.

FIG. 3 is a flowchart illustrating the operation of the electronic system 100 according to an embodiment of the present invention. The flowchart in FIG. 3 includes the following steps:

Step 310: the reference microphone 50 captures noises generated by the fan module 20 during operation and provides the corresponding wide-band noise signal f(n).

Step 320: the error microphone 55 captures overall noises of the electronic system 100 during operation and provides the corresponding error signal e(n).

Step 330: the ANC controller 60 acquires the blade number of each fan in the fan module 20 and the motor speed in each operational mode according to the synchronization signal $S_{SYN}$ provided by the embedded controller 30 and calculates a corresponding reference signal x(n).

Step 340: the ANC controller 60 acquires the actual single-blade fundamental frequency, the actual single-blade overtone frequencies, the actual blade passing frequency (BPF) fundamental frequencies and the wide-band noise spectrum of the fan module 20 during operation according to the wide-band noise signal f(n), the error signal e(n) and the reference signal e(n) for providing the speaker control signal SMIC accordingly.

Step 350: the micro speaker module 40 generates the noise cancellation signal y(n) according to the speaker control signal $S_{MIC}$.

Step 360: the ANC controller 60 provides the calibrated reference signal x' (n) associated with the reference signal x(n) and provides the calibrated noise cancellation signal y'(n) by calibrating the noise cancellation signal y (n).

The noise source during the operation of the fan module 20 originates from the air flow caused by the rotation of the motor. The narrow-band component of the noises may be thickness noises or BPF noises. Thickness noises are the result of the sound wave pulse created by the repetitive rotary motion of the air being displaced by the blade surface. BPF noises are caused by structural vibration (axial force and surface force) of the fan module 20. Since BPF and related harmonic waves are associated with the turbulent flow fluctuations as each fan blade passes a specific reference point, the periodic pressure wave at the tip of each fan blade generates a specific narrow-band noise. Also, acoustic waves are generated when the instabilities in the laminar boundary layer on the suction side of the fan blade interact with the trailing edge of the blade. These acoustic waves radiate from the trailing edge and form a feedback loop with the source of the instabilities, resulting in vortex shedding which generates wide-band noises.

In step 310, the reference microphone 50 is configured to capture noises generated by the fan module 20 during operation and provide the corresponding wide-band noise signal f(n). In step 320, the error microphone 55 is configured to capture the noises generated during the operation of the electronic system 100 and provide the corresponding error signal e(n). As previously stated, the error signal e(n) provided by the error microphone 55 is the difference between the noise signal d(n) and the calibrated noise cancellation signal y'(n), and the noise signal d(n) is mainly generated by the blade rotation of the fan module 20 during operation.

In step 330, the frequency calculator 62 of the ANC controller 60 is configured to acquire the motor speed, the single-blade frequencies and the blade number of the fan module 20 according to the synchronization signal $S_{SYN}$ provided by the embedded controller 30, wherein the value of BPF is the multiple of the motor speed and the blade number of the fan module 20. Assuming that each fan in the fan module 20 has 37 blades, the following Table 1 illustrates the data calculated by the frequency calculator 62, but does not limit the scope of present invention. The motor speed is shown in rpm, and the frequency is shown in Hertz.

TABLE 1

| Motor speed | Fundamental frequency | 1st | 2nd overtone | 3rd | Blade number | BPF | BPFx2 | BPFx3 |
|---|---|---|---|---|---|---|---|---|
| 1000 | 8.3 | 16.6 | 24.9 | 33.2 | 37 | 307.1 | 614.2 | 921.3 |
| 1000 | 16.6 | 33.2 | 49.8 | 66.4 | 37 | 614.2 | 1228.4 | 1842.6 |
| 1500 | 25 | 50 | 75 | 100 | 37 | 925 | 1850 | 2775 |
| 2000 | 33.3 | 66.6 | 99.9 | 133.2 | 37 | 1232.1 | 2464.2 | 3696.3 |
| 2500 | 41.7 | 83.4 | 125.1 | 166.8 | 37 | 1542.9 | 3085.8 | 4628.7 |
| 3000 | 50 | 100 | 150 | 200 | 37 | 1850 | 3700 | 5550 |
| 3500 | 58.3 | 116.6 | 174.9 | 233.2 | 37 | 2157.1 | 4314.2 | 6471.3 |
| 4000 | 66.7 | 133.4 | 200.1 | 266.8 | 37 | 2467.9 | 4935.8 | 7403.7 |
| 4500 | 75 | 150 | 225 | 300 | 37 | 2775 | 5550 | 8325 |
| 5000 | 83.3 | 166.6 | 249.9 | 333.2 | 37 | 3082.1 | 6164.2 | 9246.3 |
| 5500 | 91.6 | 183.2 | 274.8 | 366.4 | 37 | 3389.2 | 6778.4 | 10167.6 |
| 5700 | 95 | 190 | 285 | 380 | 37 | 3515 | 7030 | 10545 |

Next, the signal generator 64 in the ANC controller 60 is configured to generate the reference signal x(n) according to the data calculated by the frequency calculator 62, wherein the reference signal x(n) includes the information associated with the estimated overtones, the estimated BPF, and the sound pressure (dBSPL) under different motor speeds for determining the baseline power value of the speaker control signal $S_{MIC}$. The power value of the speaker control signal $S_{MIC}$ may be adjusted by varying the parameter W (Z) of the digital filter 66.

In steps 340 and 350, the digital filter 66 in the ANC controller 60 is configured to drive the speaker driving circuit 68 according to the wide-band noise signal f(n), the error signal e(n) and the reference signal x(n) for outputting the speaker control signal $S_{MIC}$, thereby driving the micro speaker module 40 so as to provide the noise cancellation signal y(n), wherein W(Z) represents the adjustable parameter of the digital filter 66.

The intrinsic characteristics of the micro speaker module 40 and the white noise transmitted to the fan module 20 influence the secondary path between the micro speaker module 40 and the error microphone 55. The micro speaker module 40 is configured to provide the noise cancellation signal y(n) which is expected to exactly cancel the noise signal d(n). However, after signal transmission via the secondary path, the noise cancellation signal y(n) captured by the error microphone 55 may not be able to exactly cancel the noise signal d(n) due to signal attenuation. Therefore in step 360, the secondary path compensation transfer function module 70 in the ANC controller 60 is configured to acquire the estimated signal of the secondary path $\hat{S}(Z)$ from the embedded controller 30 and provide the calibrated reference signal x'(n) by calibrating the reference signal x(n) according to the estimated signal of the secondary path $\hat{S}(Z)$. The secondary path transfer function module 72 in the ANC controller 60 may be a spectrum analyzer configured to measure the actual frequency response of the secondary path S(Z) and provide the calibrated noise cancellation signal y'(n) by calibrating the noise cancellation signal y (n) according to the actual frequency response of the secondary path S(Z), thereby compensating the impact of signal attenuation caused by the secondary path.

The noise weighting and conversion module 74 is coupled to the error microphone 55 and configured to process the error signal e(n) measured by the error microphone 55 using a specific signal weighting method and a specific signal conversion method and then transmit the processed error signal e'(n) to the adaptive filter 76. In an embodiment, the noise weighting and conversion module 74 may process the error signal e(n) using A weighting method and Fast Fourier Transform (FFT) method. However, the signal weighting method or the signal conversion method adopted by the noise weighting and conversion module 74 does not limit the scope of the present invention.

The adaptive filter 76 is coupled to the secondary path compensation transfer function module 70 and the noise weighting and conversion module 74 and configured to process the calibrated reference signal x'(n) and the processed error signal e'(n) using a specific algorithm for adjusting the parameter W(Z) of the digital filter 66. More specifically, the calibrated reference signal x'(n) includes the information associated with motor speed, the estimated single-blade fundamental frequency and the estimated BPF of the fan module 20. The adaptive filter 76 is configured acquire the information related to narrow-band noises (such as the actual single-blade fundamental frequency, the actual overtones and the actual BPF of the fan module 20) according to the processed error signal e'(n) for adjusting the parameter W(Z) of the digital filter 66. This way, when the digital filter 66 drives the speaker driving circuit 68 for outputting the speaker control signal SMIC, the noise cancellation signal y(n) can reflect the actual operational status and the current noise cancellation level. More specifically, the noise cancellation signal y(n) includes a plurality of noise cancellation signals which are reverse signals respectively associated with the actual single-blade fundamental frequency, the actual single-blade overtone frequency, the actual BPF fundamental frequency, the actual BPF overtone frequency and the wide-band noise spectrum.

In an embodiment, the adaptive filter 76 may process the calibrated reference signal x'(n) and the processed error signal e'(n) using least mean square (LMS) algorithm. However, the algorithm adopted by the adaptive filter 76 does not limit the scope of the present invention.

In conclusion, in the electronic system 100 of the present invention, the reference microphone 50 is configured to measure noises generated by the fan module 20 during operation and provide the corresponding wide-band noise signal f(n), and the error microphone 55 is configured to capture noises during the operation of the electronic system 100 and provide the corresponding error signal e(n). According to the wide-band noise signal f(n), the error signal e(n) and the fan information provided by the embedded controller 30, the ANC controller 60 is configured to acquire the information related to narrow-band noises and wide-band noises, based on which the micro speaker module 40 may be driven accordingly for providing the noise cancellation signal y(n) which cancels the noises generated during the operation of the electronic system 100. By adaptively adjusting the noise cancellation signal y(n) so as to reduce the error signal e(n) to zero, the present invention can address the issues of heat dissipation and noise reduction at the same time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic system with heat dissipation and feed-forward active noise control function, comprising:

a fan module configured to operate according to a fan control signal for providing heat dissipation;

an active noise cancellation controller configured to:

acquire an actual single-blade fundamental frequency, an actual single-blade overtone frequency, an actual blade passing frequency (BPF) fundamental frequency, an actual BPF overtone frequency and an actual wide-band noise spectrum of the fan module during operation according to a synchronization signal which includes information associated with a structure and an operational setting of the fan module, a wide-band noise signal associated with a wide-band noise generated during an operation of the fan module, and an error signal associated with a noise level during an operation of the electronic system; and provide a speaker control signal according to the actual single-blade fundamental frequency, the actual single-blade overtone frequency, the actual BPF fundamental frequency, the actual BPF overtone frequency and the actual wide-band noise spectrum of the fan module; and a micro speaker module configured to generate a cancellation noise signal according to the speaker control signal, wherein the cancellation noise signal includes a plurality of noise compensation signals which are reverse signals respectively associated with the actual single-blade fundamental frequency, the actual single-blade overtone frequency, the actual BPF fundamental frequency, the actual BPF overtone frequency and the actual wide-band noise spectrum.

2. The electronic system of claim 1, wherein the active noise cancellation controller comprises:

a frequency calculator configured to acquire an estimated single-blade fundamental frequency, an estimated single-blade overtone frequency, and an estimated BPF fundamental frequency of the fan module according to the synchronization signal;

a signal generator configured to generate a reference signal according to the estimated single-blade fundamental frequency, the estimated single-blade overtone frequency, and the estimated BPF fundamental frequency; and a digital filter configured to process the reference signal for determining a baseline power value of the speaker control signal.

3. The electronic system of claim 2, wherein the active noise cancellation controller further comprises:

an adaptive filter configured to adjust a parameter of the digital filter based on the reference signal, the wide-band noise signal and the error signal for adaptively adjusting a power value of the speaker control signal.

4. The electronic system of claim 3, wherein the adaptive filter is further configured to process the reference signal, the wide-band noise signal and the error signal using a least mean square (LMS) algorithm.

5. The electronic system of claim 3, further comprising:

an embedded controller configured to provide the fan control signal and the synchronization signal;

a reference microphone configured to detect the wide-band noise generated during the operation of the fan module and provide the corresponding wide-band noise signal;

an error microphone configured to detect the noise level during the operation of the electronic system and provide the corresponding error signal, wherein:

a distance between the reference microphone and the active noise cancellation controller is larger than a distance between the error microphone and the active noise cancellation controller;

the active noise cancellation controller further comprises:

a secondary path compensation transfer function module for receiving an estimated signal of a secondary path and configured to provide a calibrated reference signal by calibrating the reference signal based on the estimated signal of the secondary path; and a noise weighting and conversion module configured to provide a processed error signal by processing the error signal using a signal weighting method and a signal conversion method;

the secondary path is associated with a signal transmission path between the micro speaker module and the error microphone; and the adaptive filter is further configured to adjust the parameter of the digital filter based on the calculated reference signal and the processed error signal.

6. The electronic system of claim 5, wherein the active noise cancellation controller further comprises:

a secondary path transfer function module configured to measure an actual frequency response of the secondary path and provide a calibrated cancellation noise signal by calibrating the cancellation noise signal based on the actual frequency response of the secondary path.

7. The electronic system of claim 5, wherein the active noise cancellation controller is further configured to adjust the parameter of the digital filter based on the calibrated reference signal and the processed error signal for adaptively adjust the power value of the speaker control signal and decreasing a value of the error signal.

8. The electronic system of claim 5, wherein the error microphone is disposed at an air outlet of the fan module, and the reference microphone is disposed by a fan blade of the fan module.

9. The electronic system of claim 5, wherein the active noise cancellation controller is further configured to:

measure an actual frequency response of the signal transmission path between the micro speaker module and the error microphone; and provide a calibrated cancellation noise signal by calibrating the cancellation noise signal based on the actual frequency response of the signal transmission path between the micro speaker module and the error microphone.

10. He electronic system of claim 5, wherein the active noise cancellation controller is further configured to:

receive an estimated frequency response of a signal transmission path between the micro speaker module and the error microphone from the embedded controller; and provide a calibrated cancellation reference signal by calibrating the reference signal based on the estimated frequency response of the signal transmission path between the micro speaker module and the error microphone.

11. A method of providing heat dissipation and feed-forward active noise control function in an electronic system, comprising:

operating by a fan module in the electronic system according to a fan control signal for providing heat dissipation;

providing a synchronization signal which includes information associated with a structure and an operational setting of the fan module;

detecting a wide-band noise generated during an operation of the fan module and for providing a corresponding wide-band noise signal;

detecting a noise level during an operation of the electronic system and for providing a corresponding error signal;

operating by an active noise cancellation controller in the electronic system for acquiring an actual single-blade fundamental frequency, an actual single-blade overtone frequency, an actual blade passing frequency (BPF) fundamental frequency, an actual BPF overtone frequency and an actual wide-band noise spectrum of the fan module during operation according to the synchronization signal, the wide-band noise signal and the error signal;

operating by the active noise cancellation controller for providing a speaker control signal according to the actual single-blade fundamental frequency, the actual single-blade overtone frequency, the actual BPF fundamental frequency, the actual BPF overtone frequency and the actual wide-band noise spectrum of the fan module; and operating by a micro speaker module in the electronic system for generating a cancellation noise signal according to the speaker control signal, wherein the cancellation noise signal includes a plurality of noise compensation signals which are reverse signals respectively associated with the actual single-blade fundamental frequency, the actual single-blade overtone frequency, the actual BPF fundamental frequency, the actual BPF overtone frequency and the actual wide-band noise spectrum.

12. The method of claim 11, further comprising:

operating by a frequency calculator in the active noise cancellation controller for acquiring an estimated single-blade fundamental frequency, an estimated single-blade overtone frequency, and an estimated BPF fundamental frequency of the fan module according to the synchronization signal;

operating by a signal generator in the active noise cancellation controller for generating a reference signal according to the estimated single-blade fundamental frequency, the estimated single-blade overtone frequency, and the estimated BPF fundamental frequency; and operating by a digital filter in the active noise cancellation controller for processing the reference signal so as to determine a baseline power value of the speaker control signal.

13. The method of claim 12, further comprising:

operating by an adaptive filter in the active noise cancellation controller for adjusting a parameter of the digital filter based on the reference signal, the wide-band noise signal and the error signal so as to adaptively adjust a power value of the speaker control signal.

14. The method of claim 13, further comprising:

operating by the adaptive filter for processing the reference signal, the wide-band noise signal and the error signal using an least mean square (LMS) algorithm.

15. The method of claim 13, further comprising:

operating by an embedded controller in the electronic system for providing the fan control signal and the synchronization signal;

operating by a reference microphone in the electronic system for detecting the wide-band noise generated during the operation of the fan module and for providing the corresponding wide-band noise signal;

operating by an error microphone in the electronic system for detecting the noise level during the operation of the electronic system and for providing the corresponding error signal;

operating by a secondary path compensation transfer function module in the active noise cancellation controller for receiving an estimated signal of a secondary path from the embedded controller, wherein the secondary path is associated with a signal transmission path between the micro speaker module and the error microphone;

operating by the secondary path compensation transfer function module for providing a calibrated reference signal by calibrating the reference signal based on the estimated signal of the secondary path;

operating by a noise weighting and conversion module in the active noise cancellation controller for providing a processed error signal by processing the error signal using a signal weighting method and a signal conversion method; and operating by the adaptive filter for adjusting the parameter of the digital filter based on the calculated reference signal and the processed error signal.

16. The method of claim 15, further comprising:

operating by a secondary path transfer function module in the active noise cancellation controller for measuring an actual frequency response of the secondary path; and operating by the secondary path transfer function module for providing a calibrated cancellation noise signal by calibrating the cancellation noise signal based on the actual frequency response of the secondary path.

17. The method of claim 15, further comprising:

operating by the active noise cancellation controller for adjusting the parameter of the digital filter based on the calibrated reference signal and the processed error signal so as to adaptively adjust the power value of the speaker control signal and decrease a value of the error signal.

18. The method of claim 15, further comprising:

disposing the error microphone at an air outlet of the fan module; and disposing the reference microphone by a fan blade of the fan module.

19. The method of claim 15, further comprising:

operating by the active noise cancellation controller for measuring an actual frequency response of the signal transmission path between the micro speaker module and the error microphone; and operating by the active noise cancellation controller for providing a calibrated cancellation noise signal by calibrating the cancellation noise signal based on the actual frequency response of the signal transmission path between the micro speaker module and the error microphone.

20. The method of claim 15, further comprising:

operating by the active noise cancellation controller for receiving an estimated frequency response of a signal transmission path between the micro speaker module and the error microphone from the embedded controller; and providing a calibrated cancellation reference signal by calibrating the reference signal based on the estimated frequency response of the signal transmission path between the micro speaker module and the error microphone.

* * * * *